(12) United States Patent
Feldstein et al.

(10) Patent No.: US 8,490,951 B2
(45) Date of Patent: *Jul. 23, 2013

(54) HIGH PRESSURE HUMIDIFIER

(75) Inventors: George Feldstein, Cresskill, NJ (US);
Jeff Wilson, River Vale, NJ (US)

(73) Assignee: Creston Electronics Inc., Rockleigh, NJ (US)

( * ) Notice: Subject to any disclaimer, the term of this patent is extended or adjusted under 35 U.S.C. 154(b) by 370 days.

This patent is subject to a terminal disclaimer.

(21) Appl. No.: 13/048,298

(22) Filed: Mar. 15, 2011

(65) Prior Publication Data

US 2011/0163170 A1    Jul. 7, 2011

Related U.S. Application Data

(63) Continuation-in-part of application No. 12/207,882, filed on Sep. 10, 2008, now Pat. No. 7,934,702, which is a continuation-in-part of application No. 12/080,628, filed on Apr. 4, 2008, now Pat. No. 7,552,914.

(51) Int. Cl.
    *B01F 3/04*    (2006.01)
(52) U.S. Cl.
    USPC ............... 261/4; 261/26; 261/116; 261/129; 261/DIG. 15
(58) Field of Classification Search
    USPC ............ 261/3–5, 26, 115–118, 129, DIG. 15, 261/DIG. 78; 126/113
    See application file for complete search history.

(56) References Cited

U.S. PATENT DOCUMENTS

| 1,801,565 | A | * | 4/1931 | Norton | 261/30 |
| 2,217,130 | A | * | 10/1940 | Niehart | 96/275 |
| 2,504,278 | A | * | 4/1950 | Read et al. | 236/44 A |
| 3,102,531 | A | * | 9/1963 | Gross | 126/113 |
| 3,250,266 | A | * | 5/1966 | Auringer | 126/113 |
| 3,334,877 | A | * | 8/1967 | Payne | 261/71 |
| 3,515,348 | A | * | 6/1970 | Coffman, Jr. | 239/103 |
| 3,570,472 | A | * | 3/1971 | Santangelo | 126/113 |
| 3,689,037 | A | * | 9/1972 | Payne | 261/105 |
| 3,770,254 | A | * | 11/1973 | Morrow | 261/105 |
| 3,791,633 | A | * | 2/1974 | Lowe | 261/101 |
| 3,855,371 | A | * | 12/1974 | Morrow et al. | 261/100 |
| 3,898,976 | A | * | 8/1975 | Coffman, Jr. | 126/113 |
| 4,211,735 | A | * | 7/1980 | Berlin | 261/116 |
| 4,354,985 | A | * | 10/1982 | Johnson | 261/100 |

(Continued)

FOREIGN PATENT DOCUMENTS

JP    55-121334 A  *  9/1980

OTHER PUBLICATIONS

"Installation Manual, Humid-A-Mist Model HUM-100"; (date unknown); Galmar Enterprises, Inc., New Lenox, IL 60451.*

(Continued)

*Primary Examiner* — Richard L Chiesa
(74) *Attorney, Agent, or Firm* — Creston Electronics Inc.

(57) ABSTRACT

A high pressure water injection humidifier includes a high pressure pump driven by a stepper motor, which provides pressurized water to a plurality of exit nozzles, each exit nozzle having a precision orifice that atomizes the pressurized water into a mist, where the volume rate of the mist is dependent only on the motor speed and the diameter of the precision orifice. Proper nozzle flow can be determined by monitoring the torque of the stepper motor.

11 Claims, 4 Drawing Sheets

U.S. PATENT DOCUMENTS

Figure 1:
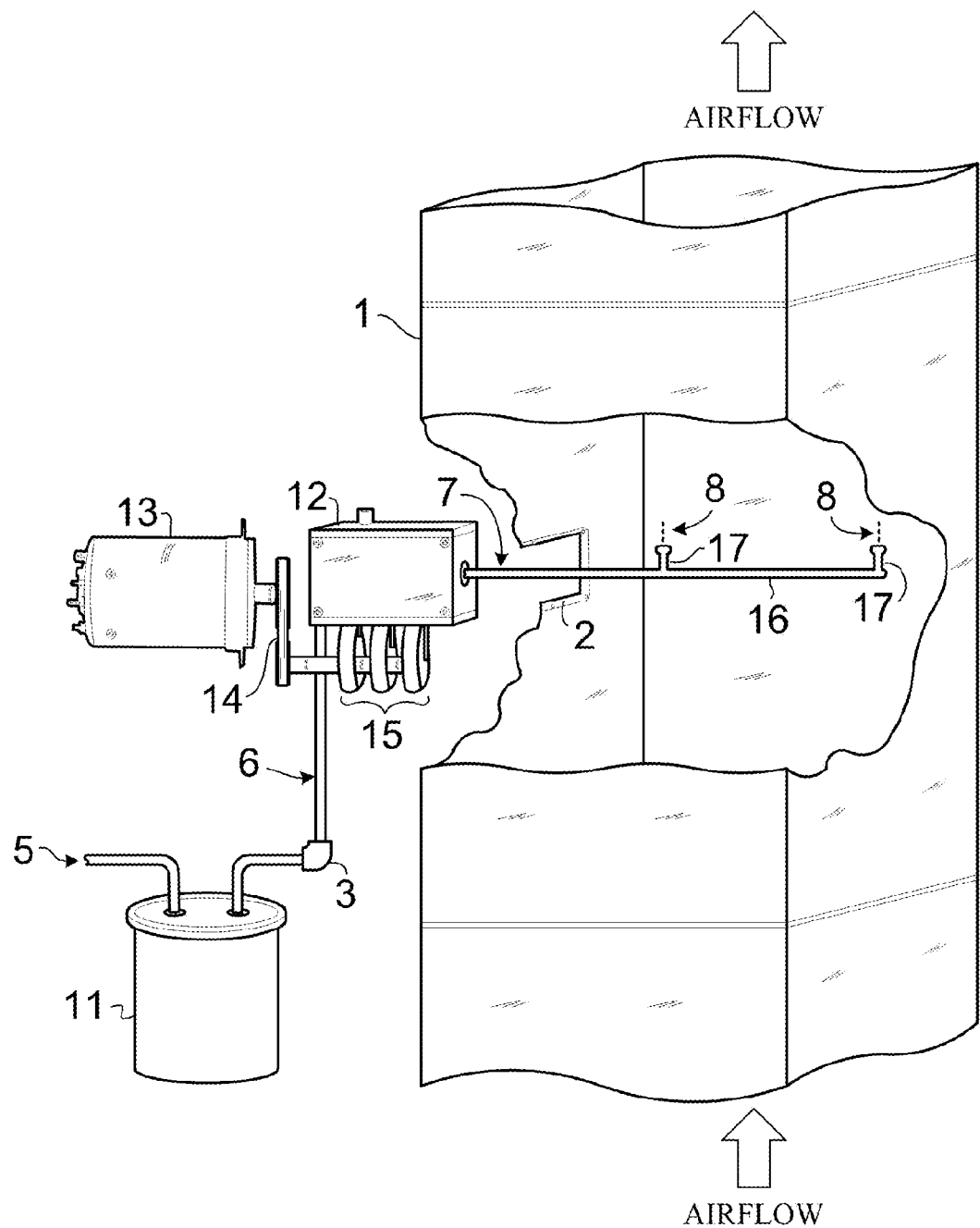

| | | | | |
|---|---|---|---|---|
| 4,913,856 A | * | 4/1990 | Morton | 261/116 |
| 5,037,585 A | * | 8/1991 | Alix et al. | 261/142 |
| 5,075,047 A | * | 12/1991 | Youngeberg | 261/100 |
| 5,277,849 A | * | 1/1994 | Morton et al. | 261/118 |
| 5,336,451 A | * | 8/1994 | Lovick | 261/116 |
| 5,407,604 A | * | 4/1995 | Luffman | 261/4 |
| 5,450,893 A | * | 9/1995 | Galba et al. | 165/229 |
| 5,525,268 A | * | 6/1996 | Reens | 261/78.2 |
| 6,092,794 A | * | 7/2000 | Reens | 261/115 |
| 6,129,285 A | * | 10/2000 | Schafka | 236/44 C |
| 6,398,196 B1 | * | 6/2002 | Light et al. | 261/130 |
| 7,552,914 B1 | * | 6/2009 | Feldstein | 261/4 |
| 7,934,702 B1 | * | 5/2011 | Feldstein | 261/4 |
| 2005/0212152 A1 | * | 9/2005 | Reens | 261/81 |

OTHER PUBLICATIONS

"Armstrong Cool-Fog Systems" product brochure; (date unknown); Armstrong Humidification Group, Three Rivers, MI 49093.*

"Humifog High Pressure Atomizing Humidifier" product brochure (date uhnknown); Carel USA, Manheim, PA 17547.*

* cited by examiner

HIGH PRESSURE HUMIDIFIER

CROSS REFERENCE TO RELATED APPLICATIONS

This application is a continuation-in-part of application Ser. No. 12/207,882, filed on Sep. 10, 2008 now U.S. Pat. No. 7,934,702, which is a continuation-in-part of application Ser. No. 12/080,628, filed on Apr. 4, 2008, U.S. Pat. No. 7,552,914.

BACKGROUND OF THE INVENTION

1. Technical Field

The present invention relates to climate control humidifiers and more specifically to a high pressure water injection humidifier having a constant speed motor and a precision orifice.

2. Background Art

It is well known that low ambient humidity in a building space leads to occupant discomfort, possible health problems, and electricity discharges. Such low ambient humidity also causes damage to furniture, papers, artwork, and musical instruments contained within the building. To obviate these problems, it is common practice to employ devices for adding moisture to the air. In this regard, a wide variety of humidification devices are commonly employed.

For example, evaporative type systems have been installed in the furnace plenum or heating ducts so that heated air is forced to flow through and about sponge-like members that are maintained in a moist condition by placing them in contact with a water reservoir. Such reservoirs must be maintained at a preset level to ensure sufficient moisture content in the sponge-like members. It is also known to utilize a steam generator in combination with a forced air heating system to place water vapor into the heated air stream. The steam is generated by use of a submerged heating element in a water reservoir tank. In each of these systems, the reservoir water level must be maintained at a predetermined level.

One of the specific problems associated with these water reservoir systems is that they provide a tank of standing water that can be a breeding ground for bacteria, molds, and other unhealthy agents.

In response to this problem, steam injection humidifiers have been developed. These systems connect to a continuous pressurized source of water such as a municipal water hookup, convert that water into steam, and spray that steam through a nozzle directly into the heated air system. However, these steam injection systems present other problems such as the corrosive nature of steam, especially when operating from a non-filtered water supply, the amount of energy required to convert water to steam quickly enough to provide a continuous supply of steam, and the danger of steam leaks.

In the associated field of residential air cooling systems (e.g. air conditioning); an adiabatic evaporative cooling process is used in which water is sprayed into the air without adding or extracting heat. Those knowledgeable in the field will recognize that when an unsaturated airflow is passed through a water spray, water will be evaporated and pass into the airflow as water vapor as long as the saturation point, for a given ambient temperature, is not reached. The heat required for such evaporation, latent heat of evaporation, comes only from the air. Accordingly, ambient air temperature is reduced and moisture content is increased without increasing the heat content of the air; also known as a constant enthalpy process.

Water injection humidification has been attempted, such as for example by a "Humid-A-Mist™" system manufactured by Galmar Enterprises Inc., of New Lenox, Ill. However such a system injects water at a typical residential water supply pressure of between 50 and 100 pound per square inch (psi) which disadvantageously results in relatively large water droplet sizes.

There is a non-associated field of water-jet cutting in which is known a method of cutting materials using a jet of water. Such cutting can be done for soft or low density materials, such as foam, using water only, or for hard dense materials, such as tool steel, by adding an abrasive to the water-jet. The water is forced through a precision orifice to create a well defined stream of water, typically produced under pressures of 40,000 to 60,000 PSI (pounds per square inch). The pump high-rate water flows and extreme high water pressures associated with water-jet cutting are not desirable for residential humidification.

To solve the aforementioned problems associated with the existing state of the art in residential humidification systems, the present invention injects atomized water directly into an operational airflow, such as a heated airflow from a forced air heating system or alternatively an unheated airflow from a stand-alone fan. I have discovered that using a relatively high water pressure, such as 1000 psi, in conjunction with a low-rate water flow, such as 1 gallon per hour, and a precision orifice gives unexpected and desirable results that are directly applicable to residential humidification. Advantageously, preferred embodiments of the present invention incorporate several features to protect against water leakage, indicate system faults, provide water flow indication, and establish humidification profiles based on outside air temperature.

SUMMARY OF THE INVENTION

The following summary of the invention is provided to facilitate an understanding of some of the innovative features unique to the present invention. A full appreciation of the various aspects of the invention can only be gained by taking the entire specification, claims, drawings, and abstract as a whole.

According to one aspect, the present invention provides a humidification system that comprises a low volume high pressure pump, a stepper motor, a wand pipe, and a plurality of exit nozzles. The low volume high pressure pump accepts filtered water and provides pressurized water at a constant high pressure. The stepper motor is mechanically connected to the pump and drives the pump. The wand pipe extends into a plenum of a heating system and accepts the pressurized water. The wand pipe further comprises a plurality of exit nozzles where each nozzle includes a precision orifice that atomizes the pressurized water into a mist and injects that mist into an operational airflow of the heating system. The diameter of each precision orifice is sized in conjunction with the constant speed of the stepper motor to provide a precise constant volume flow of atomized water.

According to a second aspect, the present invention provides a humidifier configured for use within the plenum of an existing heating system which uses an operational airflow. The humidifier comprises a humidity sensor, a duty-cycle signal, a filtration system, a low volume high pressure pump, a stepper motor, a wand pipe, and a plurality of exit nozzles. The humidity sensor measures the humidity of air entering the heating system and provides a humidity value signal. The duty-cycle signal is computed from the humidity value signal and a predetermined control profile. The filtration system filters suspended particles from an incoming water supply and provides filtered water to the low volume high pressure pump which accepts this filtered water and provides pressurized water at a constant high pressure. The stepper motor is mechanically connected to the pump and drives the pump in response to the duty-cycle signal. The wand pipe further comprises a plurality of exit nozzles where each nozzle includes a precision orifice that atomizes the pressurized water into a mist and injects that mist into the operational airflow. The diameter of each precision orifice is sized in conjunction with the constant speed of the stepper motor to provide a precise constant volume flow of atomized water.

The present invention seeks to overcome or at least ameliorate one or more of several problems, including but not limited to: providing a humidifier that does not require a standing water reservoir or the use of steam.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”.

BRIEF DESCRIPTION OF DRAWINGS

The accompanying figures further illustrate the present invention.

BRIEF DESCRIPTION OF THE SEVERAL VIEWS OF THE DRAWING

FIG. 1 depicts an isometric view of the major components of the inventive humidifier as installed in an illustrative hot air heating system.

FIG. 2 depicts additional components of the inventive humidifier as shown in FIG. 1.

FIG. 3 shows a control panel suitable for use with the inventive humidifier according to one illustrative embodiment of the present invention.

FIG. 4 depicts components of the inventive humidifier according to one embodiment of the invention.

LIST OF REFERENCE NUMBERS FOR THE MAJOR ELEMENTS IN THE DRAWING

The following is a list of the major elements in the drawings in numerical order.

1 plenum (existing heating system)
2 rectangular opening (in plenum 1)
3 leak detector
5 tap water
6 filtered water (from filtration system 11)
7 pressurized water (from high pressure pump 12)
8 atomized water (from nozzle 17)
11 filtration system
12 high pressure pump
13 constant speed motor (drives high pressure pump 12)
14 drive belt
15 cam system
16 wand pipe
17 nozzle
21 pressure sensor (pump supply side)
22 pump pressure relief
23 water shut-off valve
24 humidity sensor
25 control electronics
26 drip tray
27 drip sensor (within drip tray 26)
28 nozzle flow detector
29 airflow temperature sensor
30 control panel
43 stepper motor
251 humidistat
252 outside air temperature

DETAILED DESCRIPTION OF THE INVENTION

The present invention is an improved humidification system applicable to residential housing.

Mode(s) for Carrying Out the Invention

Refer first to FIG. 1 which shows the major components of my inventive high pressure humidifier system as it might typically be installed into an existing residential forced hot air heating system. Existing heating plenum 1 is shown in a cut-way view. A rectangular opening 2 is cut into plenum 1 when the humidifier is installed, in a well known manner.

During normal operation, tap water 5 enters filtration system 11, such as an osmotic or ion-exchange filtration system adapted to suspended particles from the water in stages, and exits as filtered water 6. Any leaks in the filtered water 6 line are detected by leak sensor 3. In one illustrative embodiment, tap water 5 at a pressure of between 50 and 100 pounds per square inch (psi) is connected through a ¼" inner diameter (ID) tube to a sediment filter, which removes the largest particles from the tap water 5. After the sediment filter, the water is then routed through carbon filters that remove chemicals such as chlorine. After the carbon filters, the water is routed through a reverse osmosis membrane filter leaving any remaining suspended particles caught in the membrane. The filtered water 6 then exits the filtration system 11 via ¼" ID tubing. Advantageously, the present inventive humidification system is constantly filtering the water being used in a closed system, such filtered water 6 is not allowed to stagnate and will be mold and bacteria free. In certain embodiments, the filtered water 6 is further sterilized by an ultraviolet (UV) sterilizer, not shown The filtered water 6 exits the filtration system 11 and enters high pressure pump 12 which is mechanically driven by constant speed motor 13 via a transmission having a drive ratio, such as drive belt 14 and cam system 15. The high pressure pump 12 increases water pressure from standard pressure, such as 50 to 100 psi up to an operating high pressure, such as 1000 psi. After such pressurization, pressurized water 7 exits the high pressure pump 12.

In one illustrative embodiment, the constant speed motor 13 is an AC induction motor, selected for durability, efficiency, and an ability to provide sufficient starting torque at a high rotational speed. In this embodiment, the cam system 15 comprises three cams, offset 120 degrees from each other, mounted to a shaft using needle bearings. The shaft has ball bearings on each end, which attach to two end plates using C-class clips. A first pulley, mounted on this shaft, is operably connected to drive belt 14 which is in turn operably connected to a second pulley mounted on the shaft of constant speed motor 13. A computer such as a microprocessor, not illustrated, monitors the pump 12 input water pressure, output water pressure, and drive shaft torque and therefrom computes and controls the duty-cycle of constant speed motor 13, such as 5 minutes on, 3 minutes off, etc. The pump 12 further comprises a manifold and a top plate. The pump manifold has a ¼" ID inlet tube and a ⅛" ID outlet tube and internally includes three working pistons, driven by cam system 15, check valves associated with each piston, and a high-pressure monitor. The check valves consist of springs and ring seals and are mounted to the manifold by plugs located on the sides thereof.

In a preferred embodiment, the cam system 15 is combined with the high pressure pump 12 into an integral assembly.

Pressurized water 7 exits the high pressure pump 12 and enters the heating plenum 1 via wand pipe 16. The pressurized water must be sufficiently filtered to eliminate particles that would be large enough to clog a very small diameter orifice, such as 0.004" diameter.

Atomized water 8 exits nozzles 17 through precision orifices and is thereby introduced into the operational airflow of the forced hot air heating system. As previously noted, in other embodiments of the present invention, such as a stand-alone humidification system, the atomized water is introduced into an unheated airflow of a stand-alone fan. Each nozzle 17 contains a small precision orifice, such as 0.004" diameter, so that a very fine mist is produced. The nozzle 17 is preferably made of a material such as stainless steel, which is durable at high water pressures. The typical water flow rate at 1000 psi is a constant ½ gallon per hour, per nozzle, where this value is dependent on the diameter of the precision orifice and the speed of the motor 13.

Figure 2:
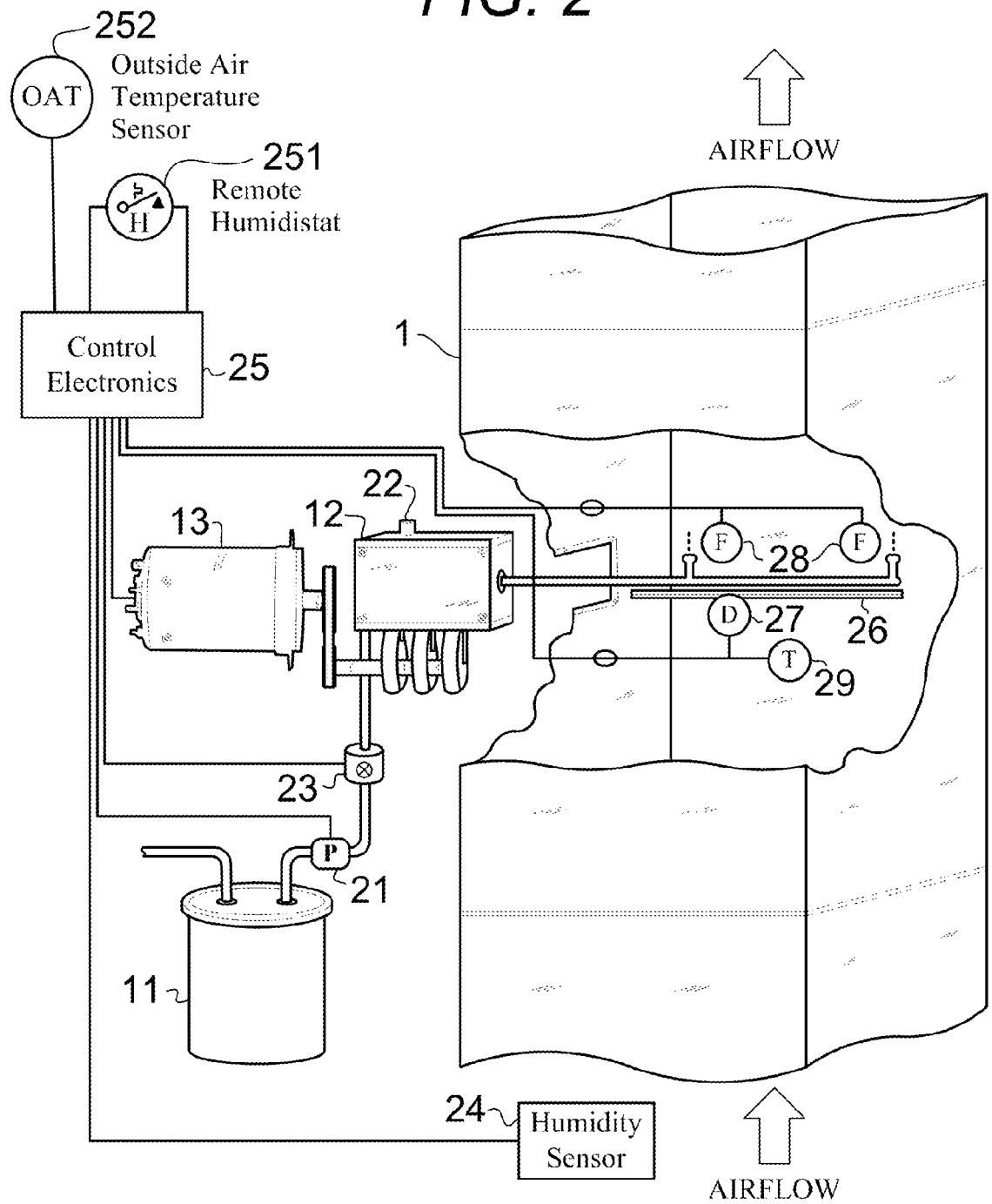

Refer now to FIG. 2 and continue to refer to FIG. 1. FIG. 2 illustrates additional components of a humidification system in accordance with several embodiments of the present invention. The overall operation of the inventive humidification system is controlled by control electronics 25 which includes processing, control logic, and electrical interfaces with the remaining system components. It will be apparent to those skilled in the art, that a microprocessor running appropriate software would be suitable for such a task.

A humidity sensor 24 detects the relative humidity of the air return from a heating zone, or in certain stand-alone humidifier embodiments, the relative humidity of the local air entering the system and produces a humidity value signal which is transmitted to control electronics 25. A remote mounted humidistat 251 in the heating zone, or in certain embodiments a locally mounted humidistat, issues a 'humidity call' when the humidity is lower than desired. The humidity call is processed by the control electronics 25, which under the appropriate circumstances described below, provides a voltage to open water control valve 26, and operates constant speed motor 13. As described previously for FIG. 1, constant speed motor 13 drives pump 12 to pressurize the water from filtration system 11.

Control electronics 25 processes the humidity value signal from humidity sensor 24, the humidity call from humidistat 251, and the temperature signal from outside air temperature sensor 252, such as a thermistor. The control electronics 25 also monitors the pump filtered water 6 supply for suitable pressure, such as at least 40 psi, using pressure sensor 21, and leaks using leak detector 3. Low water output pressure from the filtration system 11 may occur when a filter is clogged.

A pump pressure relief valve 22 prevents the pressurized water 7 from reaching an undesirable pressure level, such as 1200 psi, which might happen if a precision orifice of one of the nozzles 17 becomes blocked. If this pressure relief valve 22 is tripped, the control electronics 25 will immediately shut valve 26 and turn off constant speed motor 13 to preclude possible pump or motor damage.

It is only desirable to inject the atomized water mist into the forced air heating system when the furnace (not shown) is operating to heat the air and a fan (also not shown) is blowing the heated air through heating plenum 1. Accordingly, heater temperature sensor 29 is placed in the operational airflow prior to the wand pipe 16. Airflow temperature sensor 29 is connected to control electronics 25 and provides an indication that the operational airflow is at a suitable temperature and flow rate to absorb the atomized water, such as a heating system being operational and where it is suitable to inject water.

Drip tray 26 is positioned beneath wand pipe 16 to preclude water dripping into the airflow source, such as a furnace fan. During operation, any water remaining in drip tray 27 should be evaporated by hot airflow during the next operational cycle. To preclude any water dripping, a drip sensor 27, mounted in drip tray 26, reports the presence of water to control electronics 25.

Actual injection of atomized water 8 at nozzles 17 is monitored by nozzle flow detectors 28. In a first embodiment of the present invention, such nozzle flow detectors 28 are temperature probes and water injection is inferred at control electronics 25 by a temperature drop between the temperature measured by heater temperature sensor 29 and the temperature measured downstream of nozzles 17.

In a preferred embodiment of the present invention, the flow detectors 28 are electrical current sensors. I have discovered that the flow of highly pressured water exiting a small precision orifice, of approximately 0.004 inch diameter, requires a drive current at the constant speed motor of approximately 0.3 amps. I have further discovered that when a gasket is blown during operation (i.e. lowering the operational pressure) that a lesser drive current, such as 0.2 amps, is required. Finally, I have discovered that when nozzle flow is blocked, that a significantly higher drive current, such as 1.2 to 1.5 amps, is required at the constant speed motor.

It will be recognized by those skilled in the art that components making up my invention may be packaged in various ways, for example the cam system 15 will likely be built as an integral part of the high pressure pump 12. Similarly, the constant speed motor 13, drive belt 14, and pump 12 are packaged in an overall case (not shown) to protect them from the environment and also for ease of installation and maintenance.

I have discovered that for a low rate, such as 1 gallon per hour, high pressure, such as 1000 psi, water pump 12 providing pressurized water 7 to a nozzle 17 including a very small diameter, such as 0.004 inch, precision orifice, that the output atomized flow is function dependent on motor speed and orifice diameter and independent of input pressure, as long as the required water volume is available. Accordingly, I have developed an apparatus and method for humidifying an airstream using a relatively low-cost constant speed motor which is duty-cycle controlled, such as: on for 5 minutes, off for 3 minutes, on for 5 minutes, etc. This duty cycle is based on the known constant volume of water, such as ½ gallon per hour per nozzle 17 and a computed humidification control profile based on outside air temperature, such as measured by outside air temperature (OAT) sensor 252, and local humidity, such as measured by humidity sensor 24.

Advantageously, changing the motor 13 speed as input to the pump 12 directly changes the pump output pressure. Accordingly, a 2× pulley drive ratio at drive belt 14 is suitable for a two nozzle 17 system, a 3× pulley drive ratio at drive belt is suitable for a three nozzle system, etc. In one embodiment of my invention, the installer can select a set of pulleys based on the amount of humidification required, where the same pump 12 and constant speed motor 13 are used for multiple pulley-ratio nozzle combinations.

Figure 3:
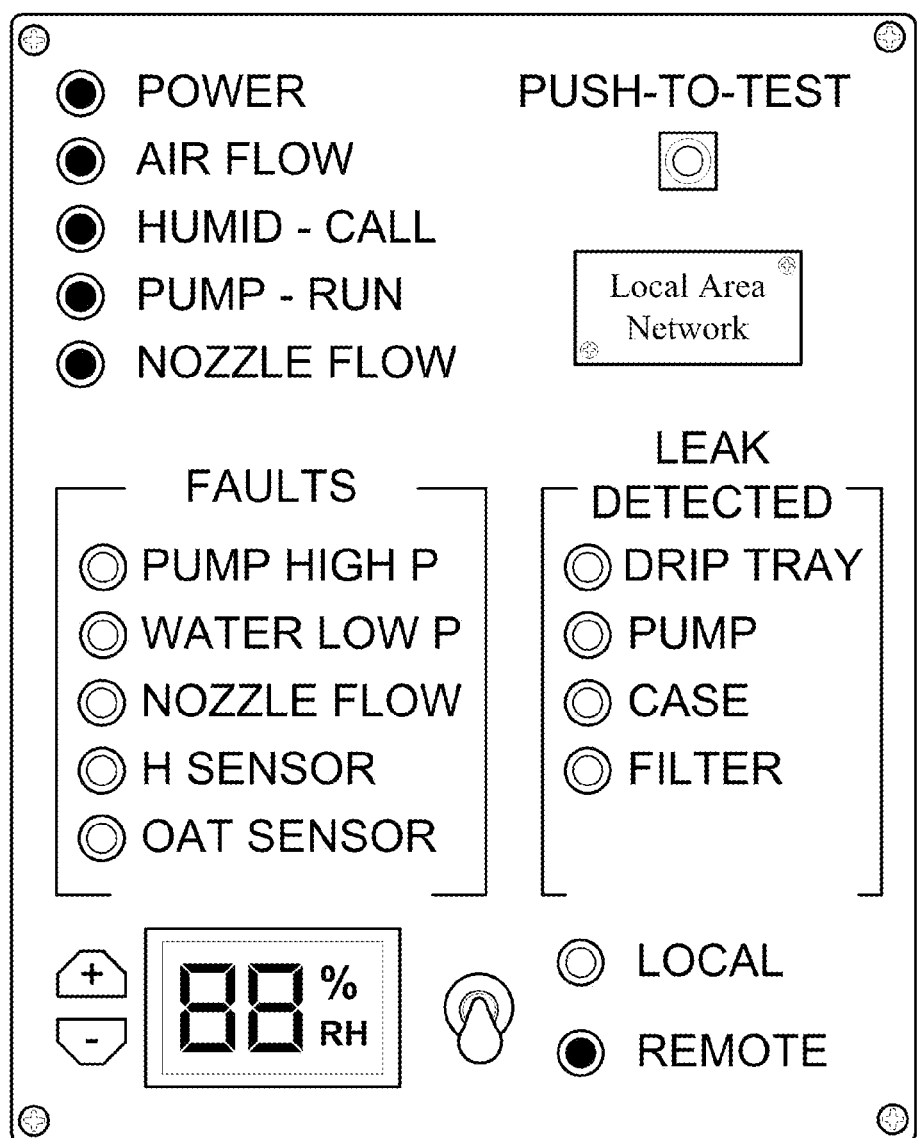

FIG. 3 shows a control panel 30 suitable for use with the inventive humidifier according to one illustrative embodiment of the present invention. Those skilled in the art will recognize that this is only one possible implementation of such a control panel and that the control panel 30 could be made integral with control electronics 25, installed as a separate unit, or even replaced with a virtual control panel on a computer display. This control panel shows that a humidity setting could be made locally, where for example a humidity sensor is installed in the heating system return duct. It also shows that various fault conditions can be displayed locally at a control panel 30 or that the control electronics 25 (shown in FIG. 2) could be connected to a local area network.

Control panel 30 is laid out in an intuitive manner for both ease of monitoring normal operation and performing maintenance. For example, normal operation is monitored by lights, such as light-emitting diodes (LED), shown in the upper left corner of the control panel 30. "Power" indicates that electrical power is being provided. "Airflow" indicates that sufficient airflow is crossing the nozzles 17 for proper system operation. For embodiments installed in a forced air heating existing plenum, a temperature probe mounted in the operational airflow upstream of the nozzles 17, such as airflow sensor 29 has proved suitable. "Humid Call" indicates that a remote mounted humidistat 251 is calling for humidification of air being provided to a particular heating zone. "Pump Run" is illuminated when the high pressure pump 13 is running.

"Nozzle Flow" (operate) is illuminated when flow detector 28 detects that atomized water is flowing flow nozzle 17. In a preferred embodiment, the control electronics 25 monitors the drive current to the constant speed motor as described above.

Depressing the "Push-to-Test" button will illuminate all of the lights and run the water pump during some part of a predetermined test sequence.

On the left side of control panel 30 and located approximately midway vertically is shown a section of fault lights. These fault lights indicate conditions that are causing, or will cause the inventive system to not operate properly. "Pump High P" indicates that the pressure relief 22 at pump 12 has been tripped, possibly because nozzle 17 flow has been impeded. "Water Low P" indicates that the pressure of filtered water 6 is less than a predetermined value, such as 40 psi, possibly due to a clogged filtration system 11, or a leak before the pump 12 inlet. "Nozzle Flow" (fault) indicates that nozzle flow detector 28 may not be functioning correctly. The "H Sensor" and "OAT Sensor" lights illuminate to indicate potential problems with the humidity sensor 24 and the outside air temperature sensors 252, respectively.

On the right side of control panel 30 and located approximately midway vertically is shown a section of 'leak detected' fault lights, which indicates that water leaks have been detected at the drip tray 26, pump 12, case (not shown), and the filtered water 6, respectively.

Finally, a 'local/remote' selection switch allows for the humidistat 251 to be either located locally, such as at the control panel, or at a remote heating zone location. Advantageously, the status of each of the lights, operation of built in test features, and selection of local humidity can be via a remote computer that is connected to the 'Local Area network" connection.

Figure 4:
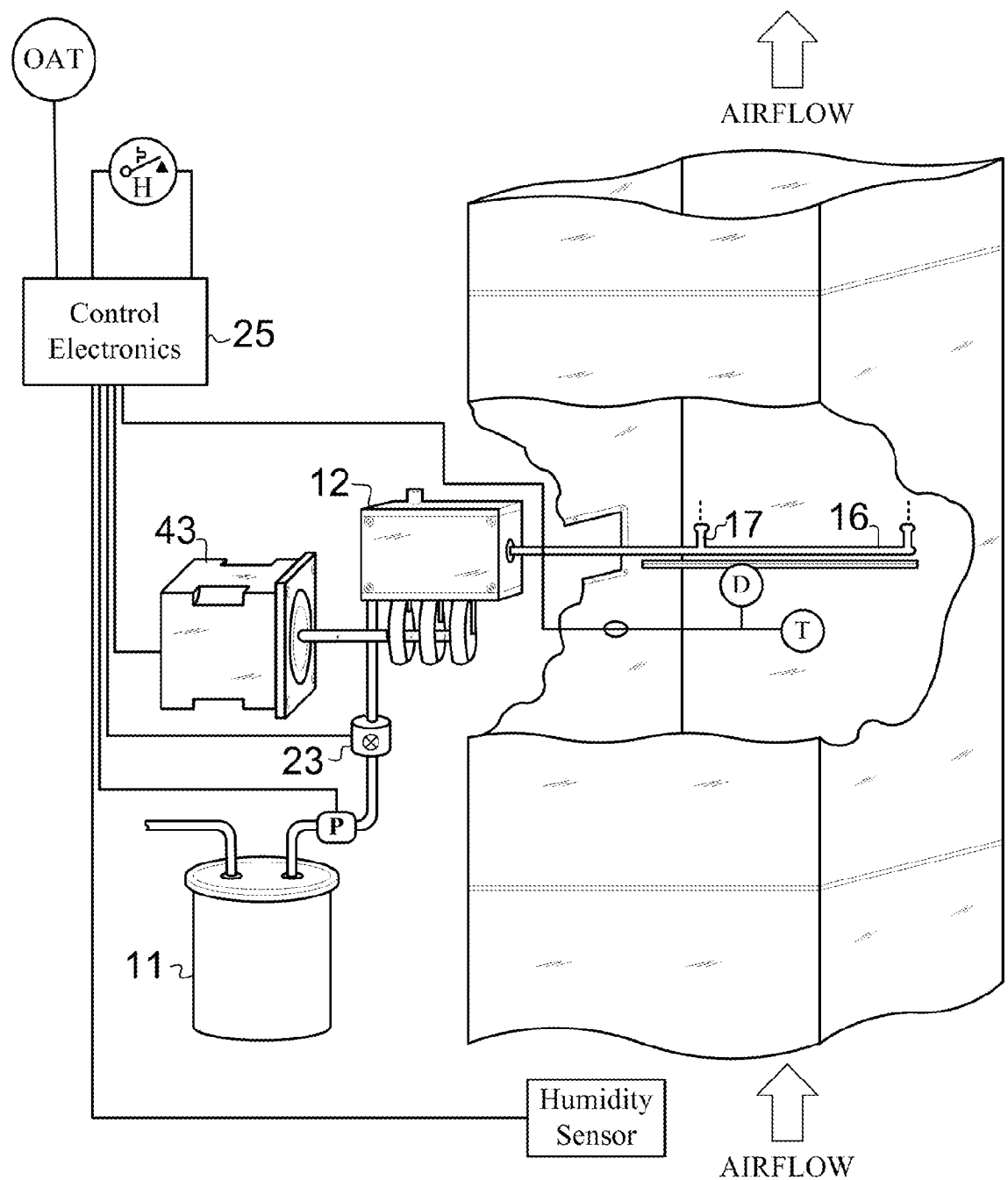

FIG. 4 shows the humidification system in accordance with another embodiment of the present invention. In this embodiment, a stepper motor 43, selected for efficiency, size, and performance, drives the pump. It will be appreciated that the stepper motors 43 is more efficient and outputs less heat when operating in a normal operating torque range than a shaded-pole motor. Additionally, as the stepper motor 43 provides sufficient torque at a low rotational speed, a complex gear train linking the output of the stepper motor 43 to the cam system 15 is not required. The smaller size and weight of the stepper motor 43 compared to shaded pole motors, as well as the obsolescence of a complex gear train cuts material costs and lowers the overall size of the humidification system allowing for flexibility in design and placement.

Control electronics 25 controls the duty cycle of the stepper motor 43. In an embodiment of the invention, control electronics 25 comprises a pulse width modulated voltage driver for driving the stepper motor. In a further embodiment control electronics receives current feedback from the stepper motor. Advantageously, the control electronics 25 can monitor the torque of the stepper motor 43 with the current feedback received from the stepper motor.

Torque monitoring functionality provided by the stepper motor 43 and associated control electronics 25 removes the necessity for pressure sensing electronics 28 as the monitored torque of the stepper motor 43 can be used to determine flow conditions of the humidification system. For example, a torque above the normal operating torque range may indicate a clog in the pump 12, wand pipe 16, or nozzle 17 and a torque output level below the normal operating torque range may indicate a leak or a blown gasket in the pump 12, wand pipe 16, or nozzle 17. When abnormal conditions are indicated by the monitored torque, control electronics 25 can shut valve 23 and turn off the stepper motor 43 to preclude possible pump damage or motor damage.

It will be appreciated by those skilled in the art that the stepper motor 43 has a wide power band, the range of speeds in which a motor can be operated efficiently, relative to a shaded pole motor. It has been found that the presence of air bubbles in the water may hinder the operation of the humidification system. Advantageously, the stepper motor 43 may be operated at a speed greater than normal operating speed for a period of time to clear air bubbles present in the water. Operating the stepper motor 43 at a speed substantially near the top of the power band for a period of time has been found to be effective at clearing air bubbles. Alternatively, the stepper motor 43 may be cycled through an increasing range of speeds to clear air bubbles present in the water.

As air bubbles may be present in the water when the humidification system has not been operated for a prolonged period of time, in an embodiment of the invention, the control electronics 25 initially operates the stepper motor 43 at a speed greater than normal operating speed upon startup. In another embodiment, the control electronics periodically operates the stepper motor at a speed greater than normal operating speed.

In yet another embodiment, upon monitoring the torque of the stepper motor above a predetermined normal operating range, instead of shutting valve 23 and turning off the stepper motor 43, the control electronics 25 operates the stepper motor 43 at a speed greater than normal operating speed for a period of time. After the period of time, the stepper motor 43 returns to normal operating speed and control electronics 25 continues to monitor the torque. If the torque remains above the normal operating range, the control electronics may then shut valve 23 and turn off the stepper motor 43.

List of Acronyms Used in the Detailed Description of the Invention

The following is a list of the acronyms used in the specification in alphabetical order.

D drip
dB decibel
DC direct current
F flow
H humidity
ID inner diameter
kHz kilohertz
LED light emitting diode OAT outside air temperature
P pressure
psi pounds per square inch
T temperature
UV ultraviolet

ALTERNATE EMBODIMENTS

Alternate embodiments may be devised without departing from the spirit or the scope of the invention. For example, a stand-alone humidifier or evaporative cycle air conditioner could use the unique low rate high pressure pump as combined with the precision orifice nozzle and the duty-cycle control as described herein. Or an improved heating, ventilation, and air conditioning (HVAC) system with the present invention included as an integral component thereof.

What is claimed is:

1. A humidifier comprising:
   (a) a low volume high pressure pump adapted to accept filtered water and to provide pressurized water at a constant high pressure;
   (b) a stepper motor mechanically connected to the pump and adapted to drive said pump;
   (c) a wand pipe extending into a plenum of a heating system and adapted to accept the pressurized water, wherein said wand pipe further comprises
      (i) an exit nozzle, including a precision orifice adapted to atomize said pressurized water into a mist and to inject said mist into an operational airflow of a heating system; and
   (d) wherein the diameter of the precision orifice is sized in conjunction with the constant speed of the motor to provide a precise constant volume flow of atomized water.

2. The humidifier of claim 1 further comprising control electronics wherein said control electronics is configured to supply a pulse width modulated voltage to the stepper motor.

3. The humidifier of claim 2 wherein said control electronics is configured to receive current feedback from the stepper motor.

4. The humidifier of claim 3 wherein the control electronics is further configured to monitor the torque of the stepper motor as determined from current feedback from the stepper motor.

5. The humidifier of claim 4 wherein the control electronics is further configured to determine a flow condition of the humidifier based on the torque of the stepper motor, and wherein:
   (a) a monitored torque above a normal operating torque range of the stepper motor, indicates a clog condition and
   (b) a monitored torque below the normal operating torque range of the stepper motor, indicates a leak condition.

6. The humidifier of claim 5 wherein the stepper motor is operated at a speed above a normal operating speed for a period of time upon determination of a clog condition.

7. The humidifier of claim 5 wherein the stepper motor is shut off upon determination of a clog condition.

8. The humidifier of claim 1 wherein the stepper motor is periodically operated at a speed above a normal operating speed for a period of time to clear air bubbles from the pressurized water.

9. The humidifier of claim 1 wherein the stepper motor is operated at a speed above a normal operating speed for a period of time at startup to clear air bubbles from the pressurized water.

10. The humidifier of claim 1 further comprising a filtration system adapted to filter suspended particles from an incoming water supply and to provide filtered water to the low volume high pressure pump.

11. A humidifier configured for use within the plenum of an existing heating system having an operational airflow therein, said humidifier comprising:
   (a) a humidity sensor adapted to measure the humidity of air entering the heating system and to provide a humidity value signal;
   (b) a duty-cycle signal computed from the humidity value signal and a predetermined control profile;
   (c) a filtration system adapted to filter suspended particles from an incoming water supply and to provide filtered water;
   (d) a low volume high pressure pump adapted to accept the filtered water and to provide pressurized water at a constant high pressure;
   (e) a stepper motor mechanically connected to the pump and adapted to drive said pump in response to the duty-cycle signal computed from the humidity sensor;
   (f) a wand pipe extending into the plenum and adapted to accept the pressurized water, wherein said wand pipe further comprises
      (i) a plurality of exit nozzles, each including a precision orifice adapted to atomize said pressurized water into a mist and to inject said mist into the operational airflow; and
   (g) wherein the diameter of each precision orifice is sized in conjunction with the constant speed of the motor to provide a precise constant volume flow of atomized water.

* * * * *